(12) United States Patent
Schneider

(10) Patent No.: US 9,751,481 B2
(45) Date of Patent: Sep. 5, 2017

(54) CROSSMEMBER

(71) Applicant: Dr. Ing. h.c. F. Porsche Aktiengesellschaft, Stuttgart (DE)

(72) Inventor: Klaus Schneider, Tiefenbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 86 days.

(21) Appl. No.: 14/659,944

(22) Filed: Mar. 17, 2015

(65) Prior Publication Data

US 2015/0274104 A1    Oct. 1, 2015

(30) Foreign Application Priority Data

Mar. 27, 2014  (DE) .................. 10 2014 104 286

(51) Int. Cl.

| | |
|---|---|
| B60K 11/06 | (2006.01) |
| B60R 19/48 | (2006.01) |
| F16D 65/78 | (2006.01) |
| B60K 11/04 | (2006.01) |
| F01P 11/10 | (2006.01) |
| B60R 19/02 | (2006.01) |
| B60K 11/08 | (2006.01) |

(52) U.S. Cl.
CPC .............. *B60R 19/48* (2013.01); *B60K 11/04* (2013.01); *B60K 11/06* (2013.01); *B60K 11/08* (2013.01); *B60R 19/023* (2013.01); *F01P 11/10* (2013.01); *F16D 65/78* (2013.01); *B60R 2019/486* (2013.01); *F01P 2050/22* (2013.01)

(58) Field of Classification Search
CPC ......... B60K 11/04; B60K 11/06; B60K 11/08; B60K 13/06; B60R 19/023; B60R 19/48; B60R 2019/486; F16D 65/78; F16D 65/87; F16D 65/827; F16D 65/847; F01P 11/10; F01P 2050/22

See application file for complete search history.

(56) References Cited

U.S. PATENT DOCUMENTS

| | | | |
|---|---|---|---|
| 4,566,407 A | 1/1986 | Peter | |
| 4,673,206 A * | 6/1987 | Kretschmer | B62D 35/005 296/180.1 |
| 4,723,594 A * | 2/1988 | Koehr | B60K 11/04 123/196 AB |
| 4,810,021 A * | 3/1989 | Burst | B60T 5/00 296/180.1 |

(Continued)

FOREIGN PATENT DOCUMENTS

| | | | |
|---|---|---|---|
| DE | 33 38 466 | 5/1985 | |
| DE | 3711682 A1 * | 9/1988 | ............... B60T 5/00 |

(Continued)

OTHER PUBLICATIONS

German Search Report of Nov. 11, 1014.
Korean Office Action Dated April 19, 2016.

*Primary Examiner* — J. Allen Shriver, II
*Assistant Examiner* — Steve Clemmons
(74) *Attorney, Agent, or Firm* — Gerald E. Hespos; Michael J. Porco; Matthew T. Hespos

(57) ABSTRACT

A crossmember (20) for a front bumper of a motor vehicle (10) has at least one throughflow opening for air. At least one exit-air opening (51, 52) is provided on a rear side (44) of the crossmember (20) to accommodate a discharge of exit air from a cooler of the motor vehicle.

6 Claims, 4 Drawing Sheets

(56) References Cited

U.S. PATENT DOCUMENTS

| | | | | |
|---|---|---|---|---|
| 4,979,584 A * | 12/1990 | Charles | ............... | B60K 11/04 |
| | | | | 165/121 |
| 5,141,068 A * | 8/1992 | Mendicino | ............ | B60K 13/06 |
| | | | | 180/68.3 |
| 6,142,213 A * | 11/2000 | Gallivan | ................. | F01P 11/10 |
| | | | | 123/41.49 |
| 8,474,557 B2 * | 7/2013 | Wolf | ........................ | B60T 5/00 |
| | | | | 180/68.1 |
| 2004/0124022 A1* | 7/2004 | Schmid | ................. | B60K 11/08 |
| | | | | 180/68.1 |
| 2011/0187134 A1 | 8/2011 | Steller et al. | | |
| 2012/0071075 A1* | 3/2012 | Wolf | ........................ | B60T 5/00 |
| | | | | 454/162 |
| 2015/0298540 A1* | 10/2015 | Matsubara | ............ | B60K 13/02 |
| | | | | 293/113 |

FOREIGN PATENT DOCUMENTS

| | | | | |
|---|---|---|---|---|
| DE | 3910560 A1 * | 10/1990 | ............ | B60K 11/04 |
| DE | 10159783 A1 * | 6/2003 | ............ | B60K 11/04 |
| DE | 10 2005 006 250 | 8/2006 | | |
| DE | 10 2005 013 635 | 9/2006 | | |
| DE | 102007023232 * | 11/2008 | ............ | B60K 11/08 |
| DE | 102007062345 * | 6/2009 | ............... | F01P 3/18 |
| DE | 10 2009 056 841 | 6/2011 | | |
| DE | 102010038350 * | 2/2012 | ............ | B60K 11/04 |
| DE | 10 2012 015 336 | 3/2013 | | |
| FR | 2934837 A1 * | 2/2010 | ............... | B60T 5/00 |
| FR | WO 2010066973 A1 * | 6/2010 | ............ | B60R 19/48 |
| JP | H14132814 U | 12/1992 | | |
| WO | 2014/041997 | 3/2014 | | |

\* cited by examiner

CROSSMEMBER

CROSS REFERENCE TO RELATED APPLICATION

This application claims priority under 35 USC 119 to German Patent Appl. No. 10 2014 104 286.7 filed on Mar. 27, 2014, the entire disclosure of which is incorporated herein by reference.

BACKGROUND

1. Field of the Invention

The invention relates to a crossmember for a front bumper of a motor vehicle having at least one throughflow opening for air. The invention also relates to a motor vehicle having such a crossmember and a method for operating a motor vehicle.

2. Description of the Related Art

DE 10 2009 056 841 A1 discloses a front part of a motor vehicle body having a cooler and having a bumper support extending transversely in front of the cooler. An air passage is formed in bumper support there and is directed toward the cooler. DE 10 2012 015 336 A1 discloses a crossmember for a bumper of a passenger motor vehicle. The crossmember has at least one throughflow region in the vehicle transverse direction and at least one throughflow opening for air. The throughflow region is adjoined to the inside by a central region and to the outside by an outer region that are free from throughflow openings for air.

It is an object of the invention to improve the discharge of exit air from a cooler in motor vehicles having a crossmember for a front bumper.

SUMMARY OF THE INVENTION

The invention relates to a crossmember for a front bumper of a motor vehicle having at least one throughflow opening for air. The crossmember has rear side with at least one exit-air opening that allows exit air to enter the crossmember from the rear. The crossmember preferably is hollow to allow air to pass through the crossmember. The exit air entering the crossmember at the rear side through the exit-air opening is guided through the crossmember, preferably to the ends thereof. By contrast to known crossmembers, the crossmember of the invention does not allow cooling air to pass through to a cooler arranged behind the crossmember. Rather, the crossmember of the invention is used for discharging exit air. Exit air refers, for example, to air that has been conducted through a cooler for cooling purposes. The use of the crossmember for discharging the exit air advantageously enables the exit air to be discharged laterally. Thus, the exit air is not discharged in the direction of the road surface, and the emergence of underbody air below the vehicle is prevented.

The crossmember may have a closed front side, a closed underside and a closed top side. The crossmember advantageously has at least one exit-air opening for air only on its rear side. Thus, the stability of the crossmember is improved in this way.

Openings may be formed on the underside to allow exit air to enter the crossmember from below.

The exit-air opening on the rear side of the crossmember may be assigned an exit-air guiding device that extends down to a cooler. The cooler may be arranged below the crossmember and may have a multiplicity of air passage openings from which the exit air emerges. The cooler preferably is a relatively small cooler such as is used in sports cars. The relatively small cooler may be arranged centrally below the crossmember. Air is conducted through the air passage openings of the cooler for cooling purposes. The air that emerges on the rear side of the cooler is referred to as exit air. The exit air emerging from the cooler may be guided or conducted at least partially by the exit-air guiding device to the exit-air opening on the rear side of the crossmember.

Exit-air ducts may extend laterally from the exit-air guiding device below the crossmember. A part of the exit air may be discharged via the exit-air ducts and a further part of the exit air may be conducted via the exit-air guiding device into the crossmember.

The exit-air ducts may extend toward wheel arches. The exit-air ducts extend from the exit-air guiding device below the crossmember to the wheel arches.

Additional exit-air ducts may extend from the ends of the crossmember and may be connected by the crossmember to the at least one exit-air opening on the rear side of the crossmember. Exit air that enters the at least one exit-air opening on the rear of the crossmember may pass through the crossmember into the additional exit-air ducts. The additional exit-air ducts in the connecting region to the crossmember, preferably have substantially the same cross section as the crossmember. However, the additional exit-air ducts advantageously are formed from a different material than the crossmember.

The additional exit-air ducts may extend toward wheel wells and may end laterally in a nose part of the motor vehicle in front of the wheel wells.

The invention also relates to a motor vehicle having a crossmember as described above and having at least one cooler arranged below the crossmember and a multiplicity of air passage openings. The crossmember preferably constitutes the front end of a supporting structure of the motor vehicle. A so-called front nose part is for example fastened to the crossmember.

Exit air may emerge on the rear side of the cooler and may be guided by the exit-air guiding device and the exit-air ducts. The exit air then is discharged entirely or partially laterally through the crossmember. This offers the advantage that the exit air is not discharged in the direction of the road surface, thereby preventing the emergence of underbody air below the vehicle.

An exit-air outflow at the outlet openings of the additional exit-air ducts is generated from a combination of a dynamic pressure on the rear side of the cooler and a suction effect of a negative pressure at outlet openings of the additional exit-air ducts. This advantageously leads to calming of an air flow that emerges from the wheel arches of the motor vehicle. The aerodynamics of the motor vehicle are improved in this way.

Further advantages, features and details of the invention will emerge from the following description, in which various exemplary embodiments will be described in detail with reference to the drawings

DETAILED DESCRIPTION OF THE PREFERRED EMBODIMENTS

Figure 1:
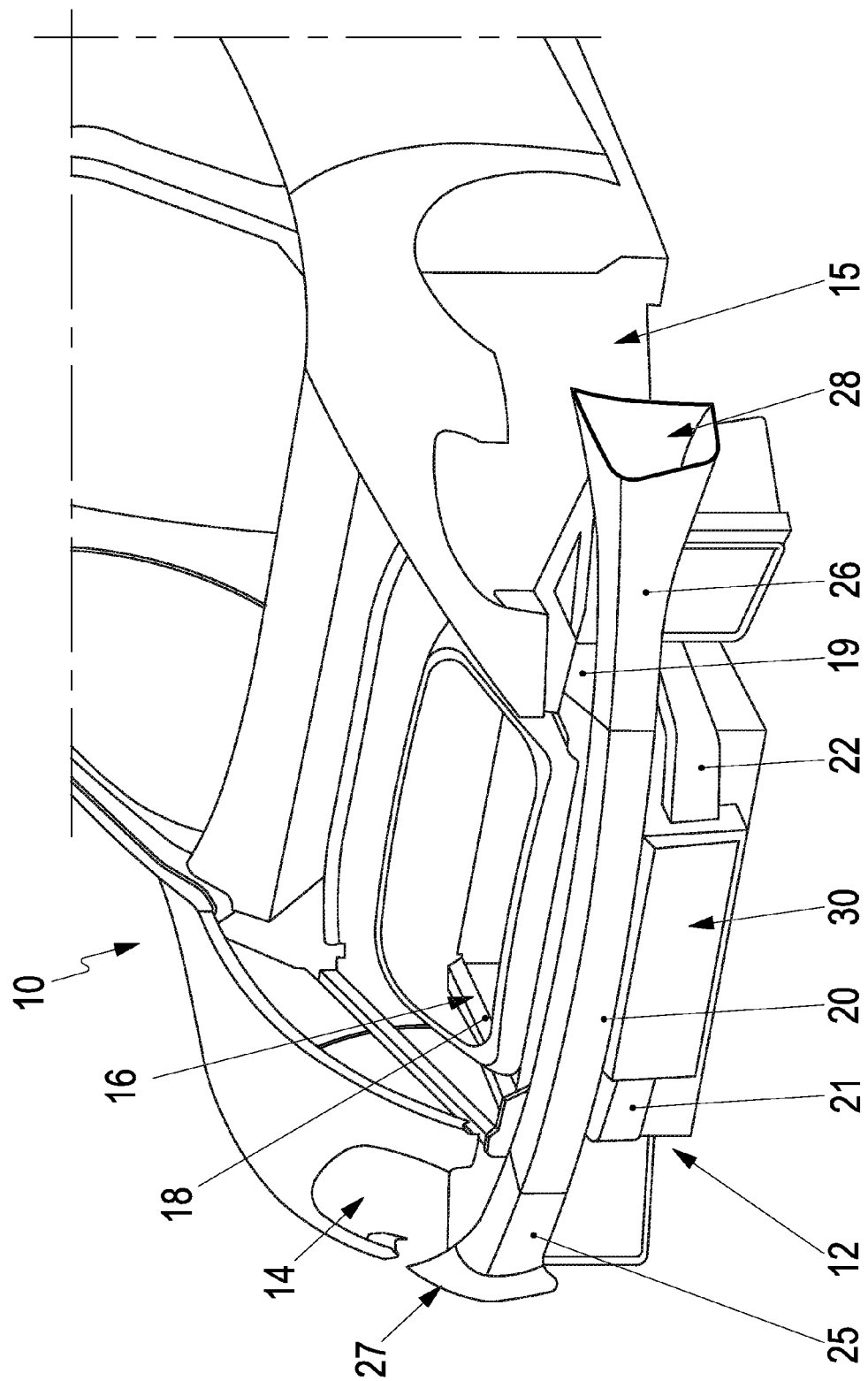
FIG. 1 is a perspective view of a motor vehicle having a crossmember according to the invention.

FIG. 1 is a perspective view of a motor vehicle 10 having a front part 12, with a front nose part omitted from the perspective view of the front part 12 of FIG. 1.

The front part 12 of the motor vehicle 10 comprises parts of a body with two wheel arches 14 and 15. The body comprises a supporting structure 16 with two longitudinal members 18, 19. A crossmember 20 is fastened to the front ends of the longitudinal members 18, 19.

Two exit-air ducts 21, 22 are assigned to the crossmember 20. The exit-air duct 21 issues into the wheel arch 14 and the exit-air duct 22 issues into the wheel arch 15. The associated outlet openings 23, 24 of the exit-air ducts 21, 22 are denoted in FIGS. 2 and 3 by 23 and 24.

Additional exit-air ducts 25, 26 extend from the ends of the crossmember 20. The additional exit-air duct 25 opens out laterally at an outlet opening 27 in front of a right wheel well of the motor vehicle 10, and the additional exit-air duct 26 opens out laterally at an outlet opening 28 in front of a left wheel well of the motor vehicle 10.

A relatively small cooler 30 is arranged centrally below the crossmember 20. The cooler 30 comprises a multiplicity of passage openings (not illustrated) for cooling air. The cooling air is supplied to the cooler 30 from the front and emerges, as exit air, on the rear side of the cooler.

Figure 2:
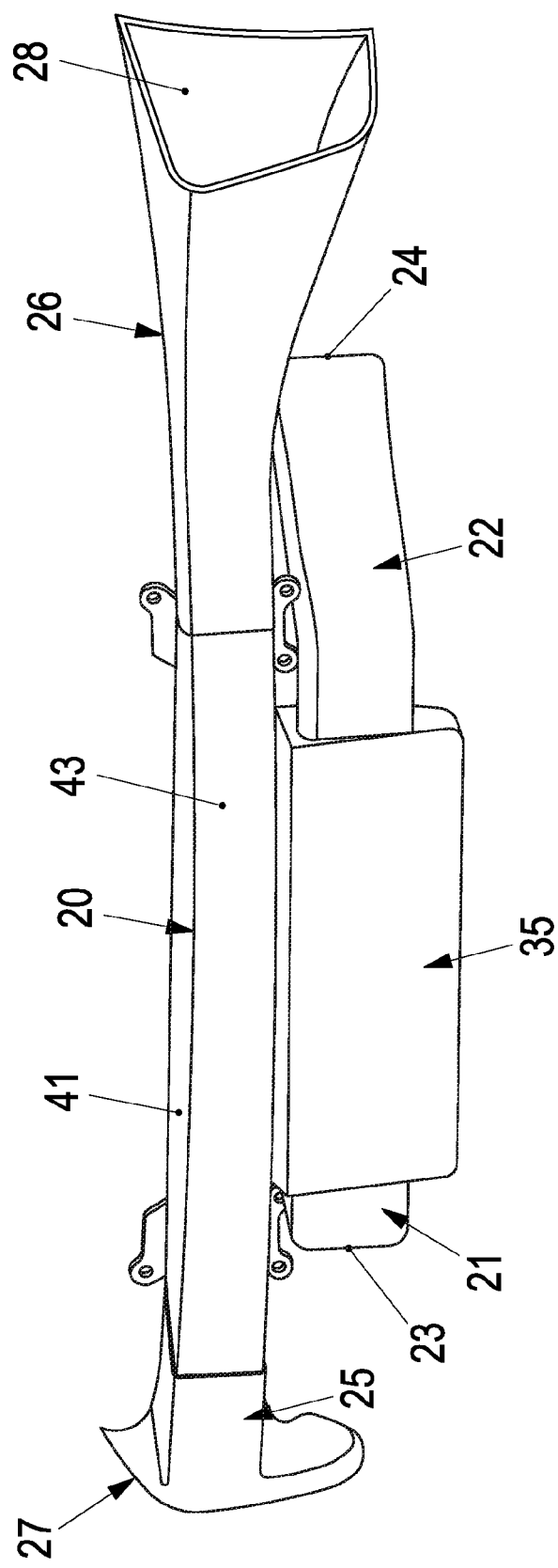
FIG. 2 is a front perspective view of the crossmember from FIG. 1 with an exit-air guiding device and exit-air ducts.

FIG. 2 shows an exit-air guiding device 35 that is arranged behind the cooler 30 shown in FIG. 1. The exit air emerging on the rear side of the cooler is collected in the exit-air guiding device 35 with a dynamic pressure being generated.

The two exit-air ducts 21 and 22 extend laterally from the exit-air guiding device 35. The exit-air ducts 21, 22 extend below the crossmember 20 and below the additional exit-air ducts 25, 26.

Figure 3:
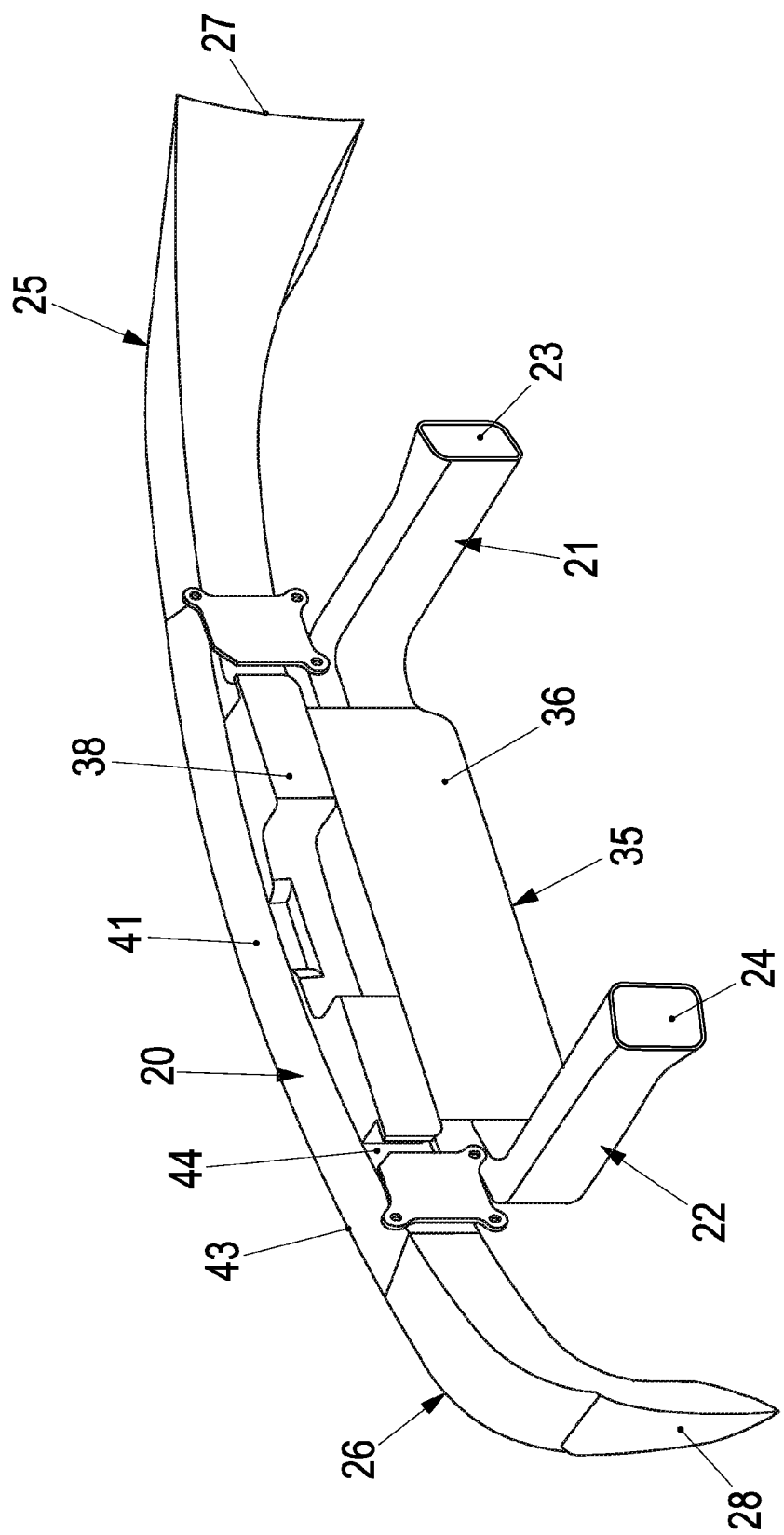
FIG. 3 is a rear perspective view of the crossmember of FIG. 2 with the exit-air guiding device and the exit-air ducts.

The exit-air ducts 21 and 22 extend from a lower part 36 of the exit-air guiding device 35, as shown in FIG. 3. The lower part 36 is connected integrally to an upper part 38 of the exit-air guiding device 35. The upper part 38 of the exit-air guiding device 35 bears against the rear side 44 of the crossmember 20.

Figure 4:
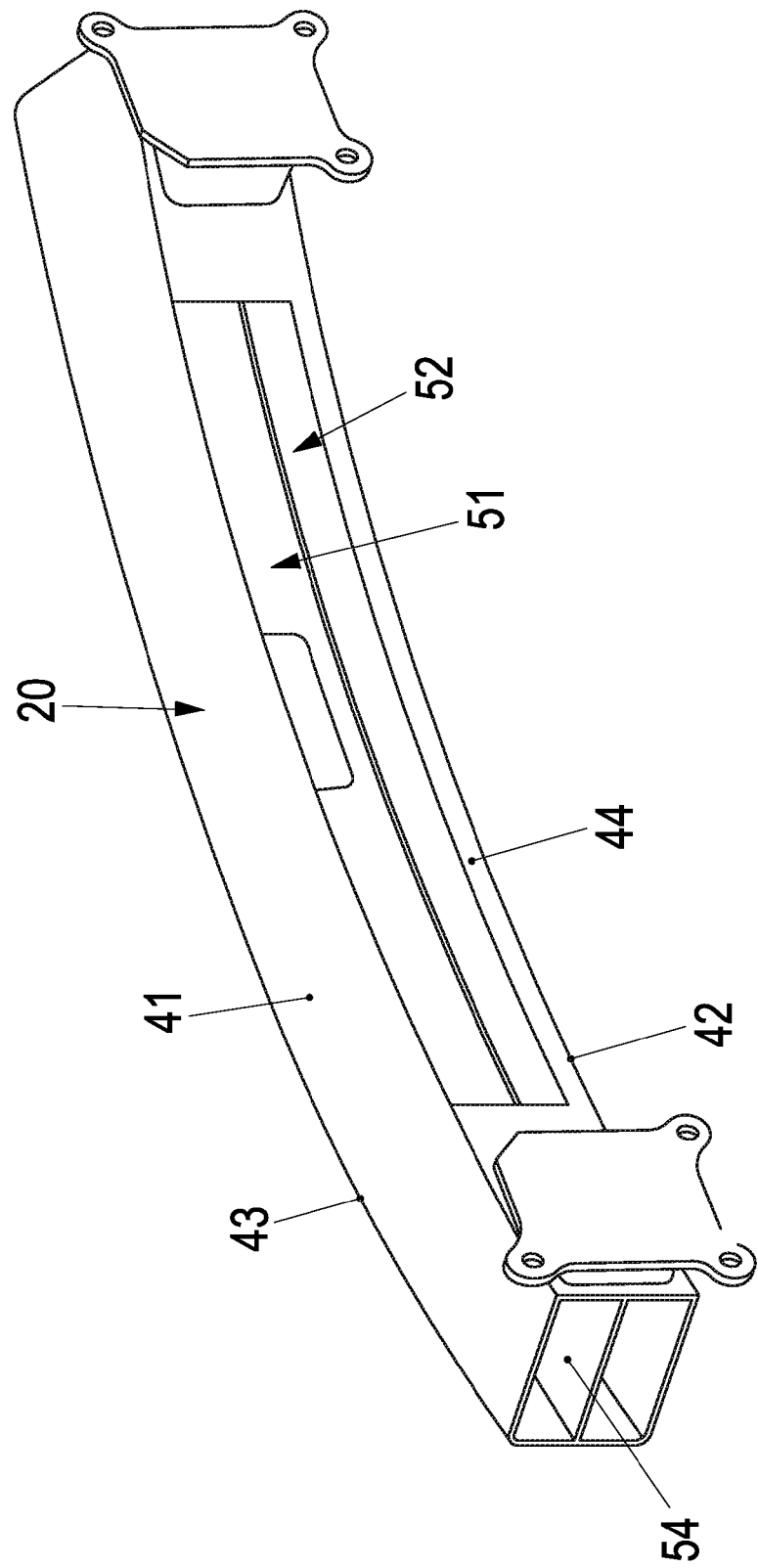
FIG. 4 is a rear perspective view of the crossmember on its own.

As shown in FIG. 4, the rear side 44 of the crossmember 20 has two exit-air openings 51, 52 that allow exit air to enter the crossmember 20 from the rear. The crossmember 20 is of closed form on its top side 41, its underside 42 and its front side 43.

The interior of the crossmember 20 has a dividing body 54 that divides a cavity in the interior of the crossmember 20 into two crossmember exit-air ducts. During the operation of the motor vehicle 10, air for cooling the cooler 30 initially is conducted through the cooler.

A part of the exit air that emerges on the rear side of the cooler 30 is discharged laterally via the exit-air ducts 21 and 22, with their outlet openings 23 and 24, into the wheel arches 14 and 15. However, a part of the exit air also is conducted via the exit-air guiding device 35 into the crossmember 20 from the rear through the exit-air openings 51, 52. This part of the exit air is conducted out through the crossmember 20, and via the additional exit-air ducts 25, 26 with their outlet openings 27, 28, into regions on the nose part or front nose part where a negative pressure prevails during operation due to the flow around the motor vehicle 10.

A useful throughflow of the additional exit-air ducts 25, 26 arises from the combination of the dynamic pressure downstream of the cooler 30 and the suction effect of the negative pressure at the outlet openings 27, 28 of the additional exit-air ducts 25, 26. This throughflow emerges from the additional exit-air ducts 25, 26 at the outlet openings 27, 28 in front of the wheel wells or wheel arches 14, 15, and advantageously calms the flow emerging from the wheel arches 14, 15. The flow emerging from the wheel arches 14, 15 may be part of a brake-cooling arrangement. The throughflow of the additional exit-air ducts 25, 26 advantageously leads to an improvement of the aerodynamics of the motor vehicle 10.

What is claimed is:

1. A crossmember for a front bumper of a motor vehicle, the motor vehicle including a cooler arranged at least partly below the crossmember, the crossmember comprising:
    a crossmember main body extending in a direction transverse to a longitudinal direction of the motor vehicle, the crossmember main body having opposite first and second ends with exit-air outlet openings and a cavity extending between the exit-air outlet openings, a rear side with at least one exit-air inlet opening formed in the rear side at a position centrally located between the first and second ends, and a dividing body disposed in the cavity and extending at least partially between the first and second ends in the direction transverse to the longitudinal direction, and closed top, bottom, and front sides;
    and
    an exit-air guiding device arranged behind the cooler and configured to collect exit-air emerging from the cooler and to direct at least a portion of the exit-air to the exit-air inlet opening for delivery of the exit-air to the exit-air outlet openings of the crossmember.

2. The crossmember of claim 1, further comprising exit-air ducts extending laterally from the exit-air guiding device below the crossmember.

3. The crossmember of claim 2, wherein the exit-air ducts extend toward wheel arches.

4. The crossmember of claim 1, wherein the exit-air outlet openings extend toward wheel wells.

5. A motor vehicle comprising the crossmember of claim 1.

6. A front end of a motor vehicle, comprising:
    a crossmember for supporting a front bumper of the motor vehicle, the crossmember including a crossmember main body extending in a direction transverse to a longitudinal direction of the motor vehicle, the crossmember main body having opposite first and second ends with exit-air outlet openings and a cavity extending between the exit-air outlet openings, and a rear side with at least one exit-air inlet opening formed therein, and a dividing body disposed in the cavity and extending at least partially between the first and second ends in the direction transverse to the longitudinal direction;
    a cooler arranged at least partly below the crossmember; and
    an exit-air guiding device arranged behind the cooler and configured to collect exit-air emerging from the cooler and to direct at least a portion of the exit-air to the exit-air inlet opening for delivery of the exit-air to the exit-air outlet openings of the crossmember.

* * * * *